United States Patent [19]

Abercia, Jr.

[11] Patent Number: 4,728,420
[45] Date of Patent: Mar. 1, 1988

[54] AIR AND WATER FLOW SYSTEM FOR AQUARIUM

[76] Inventor: Ralph Abercia, Jr., 12472 Memorial Dr., Houston, Tex. 77024

[21] Appl. No.: 793,125

[22] Filed: Oct. 30, 1985

[51] Int. Cl.⁴ .................. A01K 63/00; F16K 21/00
[52] U.S. Cl. .................................. 210/169; 119/5;
  137/592; 251/142; 251/144; 285/137.1;
  285/161; 261/64 R; 261/DIG. 38; 261/64.1
[58] Field of Search ............. 210/169, 416.2; 119/5;
  137/594, 592, 597; 251/142, 144, 122;
  285/137.1, 161; 261/64 R, DIG. 38

[56] References Cited

U.S. PATENT DOCUMENTS

| | | | |
|---|---|---|---|
| 976,242 | 11/1910 | Wohlfahrt | 210/169 |
| 2,672,845 | 3/1954 | Schneithorst | 210/169 |
| 3,149,608 | 9/1964 | Murphy | 210/169 |
| 3,232,271 | 2/1966 | Dosmantes de José et al. | 119/5 |
| 4,098,230 | 7/1978 | Jackson | 119/5 |
| 4,147,131 | 4/1979 | Walker | 119/5 |

OTHER PUBLICATIONS

"Aquarium Accessories", Caddet Catalogue, Jun. 1959.

Primary Examiner—David Sadowski
Assistant Examiner—Linda S. Evans
Attorney, Agent, or Firm—Arthur G. Yeager

[57] ABSTRACT

Aquarium with a multiple conduit fixture through one wall, the fixture including an air inlet connected to a plurality of air outlets and a water conduit, each of the air outlets and the water conduit having a throttle valve means at the outside end of the fixture to regulate the flow of air and water respectively, and a perforated support sheet to cover the inside bottom of the aquarium and any conduits for air or water, and to support thereon a gravel bed and any decorative items on the bed, the aquarium featuring several air bubbling locations.

18 Claims, 6 Drawing Figures

AIR AND WATER FLOW SYSTEM FOR AQUARIUM

BACKGROUND OF THE INVENTION

Many homes and offices display an aquarium containing small colorful exotic fish. The aquarium is usually lighted so as to be a dramatic eye-catching exhibit. Much attention has been paid to making the aquarium as attractive as possible, with glass walls on all sides to provide maximum visibility. In order to keep the aquarium water clean and life supporting, it has been necessary to include means for bubbling air upwards through the water as well as employing charcoal filters and the like. Normally this is accomplished by tubing leading from an air pump outside the aquarium over the top of a wall and down the inside to the bottom of the tank where it is discharged to bubble upwards through the water. If more than one bubbling location is desired, more than one set of air tubing must be employed. Furthermore, if a toy article, such as a sea chest, a diver, a moving grandfather's clock, or the like, is to be used with air bubbles emanating from the article, there is still another set of air tubing required. It is obvious that the tubing used to deliver the air to various locations on the bottom of the aquarium are "eyesores" which detract from the beauty of the aquarium. There also may be inlet and drain lines for introducing or draining water from the tank, necessitating still another set of unsightly tubing to mar the appearance of the aquarium.

It is an object of this invention to provide an improved system of introducing air and water into and removing water and debris from an aquarium. It is still another object of this invention to provide an aquarium which has no visible air or water lines. Other objects will appear from the more detailed description which follows.

BRIEF DESCRIPTION OF THE INVENTION

This invention relates to an aquarium having at least one vertical wall and a bottom wall and having air and water lines passing through a fixture in said vertical wall adjacent the bottom wall, a perforated support sheet spaced upwardly from and covering substantially all of said bottom wall, said support sheet adapted to be covered with a bed of gravel and other items to resemble the floor of a body of water, air lines substantially unnoticeable from outside said aquarium and leading from said fixture under said support sheet and discharging upwardly at selected locations under said bed of gravel, flow control means in the form of adjustable valves are included in said fixture and accessible outwardly of the aquarium to adjust the air flow to any selected rate and to adjust the flow of water into or out of said aquarium or to completely block the flow in either direction.

In a specific embodiment of this invention the fixture is a threaded plug which passes through an opening in the aquarium wall and is fastened to the wall with washer-seals on either side of the aquarium wall and a nut threaded onto the plug to squeeze the washer-seals tightly against such wall thereby preventing any water leakage. The fixture body contains several conduits extending through from one end to the other end of the body and fitted with adapters for attachment of tubing thereto.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
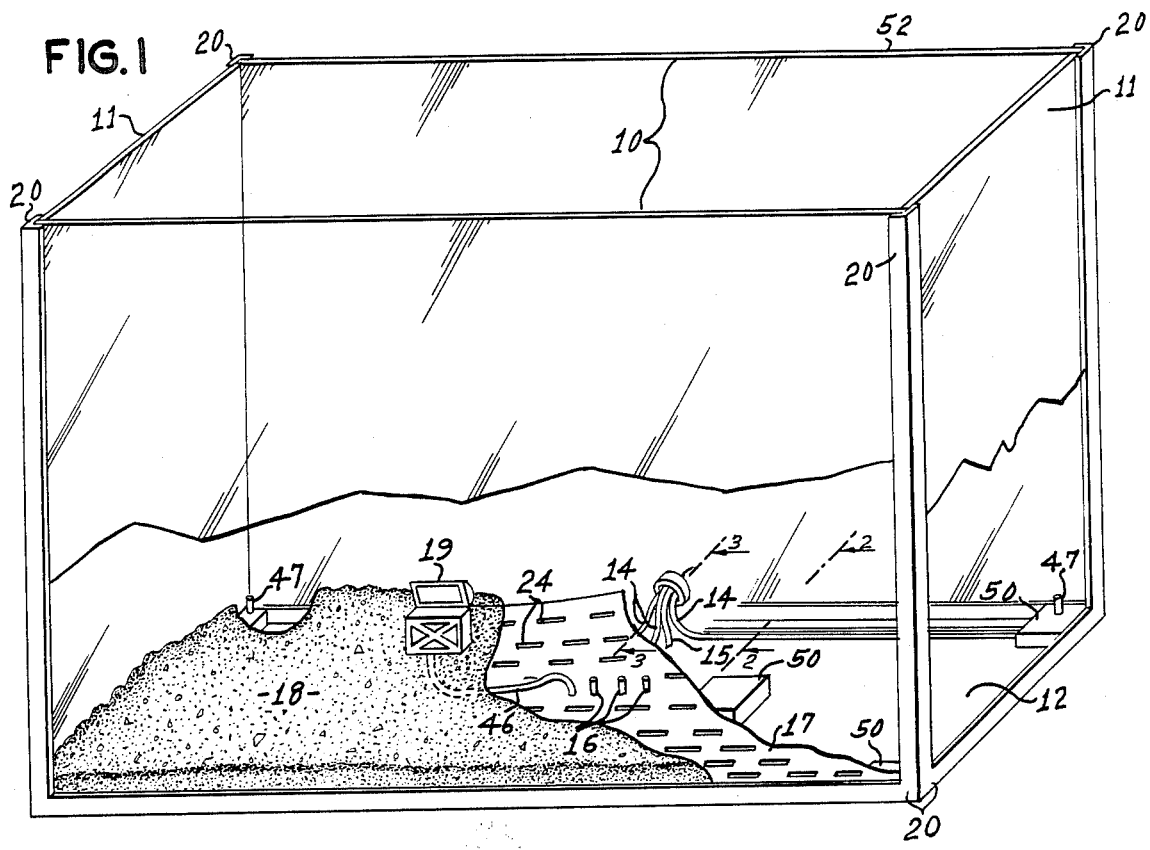
FIG. 1 is a perspective view of the air and water flow system installed in an aquarium according to this invention.
Figure 2:
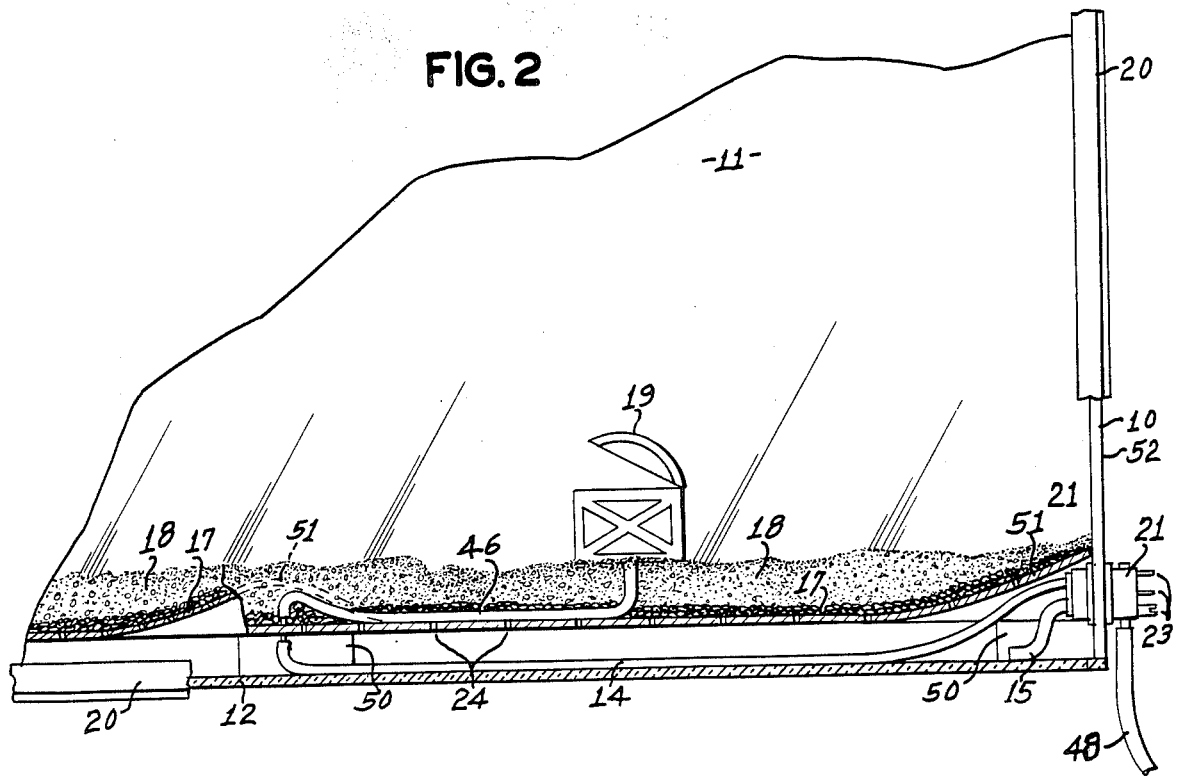
FIG. 2 is a partial cross-sectional view taken along line 2—2 of FIG. 1.

The general features of the aquarium of this invention may be appreciated from the drawings of FIGS. 1 and 2. The aquarium is a glass or plastic tank of any convenient number of walls although the most common is a rectangular structure of two side walls 10, two end walls 11, and a bottom wall 12 sealed together by known silicone sealant or the like and often contain opaque corner reinforcements 20 to make a transparent tank that will hold water. Other shapes including curved or planar walls of whatever number and configuration are equally useful in the operation of this invention.

Figure 3:
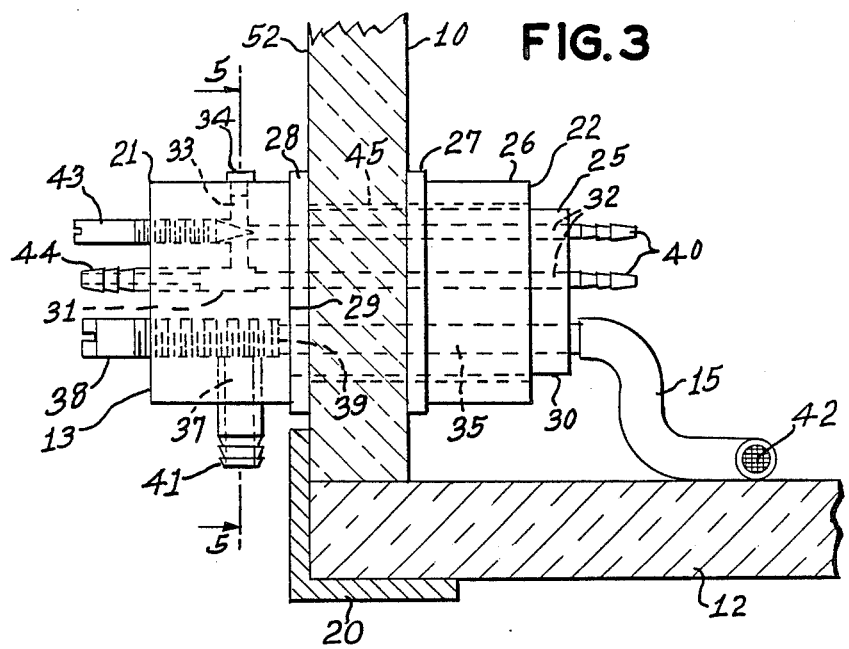
FIG. 3 is a partial cross-sectional view taken along line 3—3 of FIG. 1 showing the fixture according to this invention through a wall of the aquarium.
Figure 5:
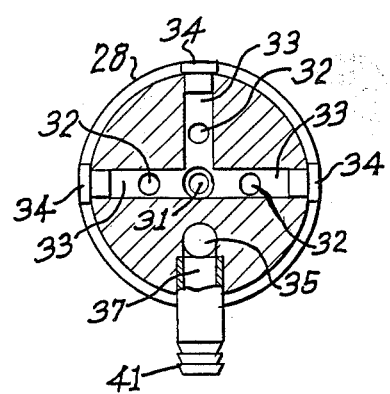
FIG. 5 is a cross-sectional view taken along line 5—5 of FIG. 3.
Figure 4:
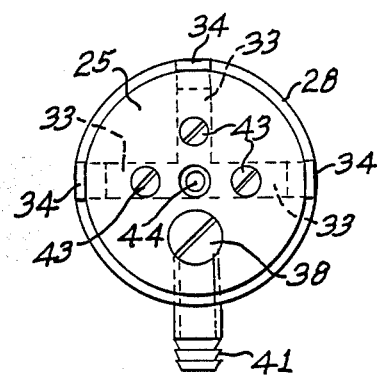
FIG. 4 is an elevational view of the fixture end outside the aquarium of FIG. 3.
Figure 6:
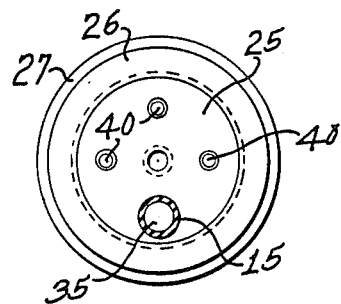
FIG. 6 is an elevational view of the fixture end inside the aquarium of FIG. 3.

On any selected wall 10, 11, or 12 there is a fixture 13 which extends through a passageway 45, as seen in FIG. 3, in the wall to which it is attached so as to have one end 22 inside the tank and the other end 21 outisde the tank. The location of fixture 13 is adjacent the bottom of any side wall 10 or end wall 11 and spaced slightly above the bottom wall 12. Fixture 13 may be placed through bottom wall 12 and spaced slightly from the bottom edges of walls 10, 11 or 12, so that it is convenient for the operator to reach dependent on where the aquarium is to be located. However, back wall or end wall mounting of fixture 13 is preferred. Through fixture 13, as will be explained below in detail, there passes the conduits for bringing air into the aquarium and for conducting water into or out of the aquarium. Air lines 14 and water line 15, with removeable screen filter 42, are shown attached to the inside end of fixture 13 and extend to whatever location is desired adjacent bottom wall 12. Fixture 13 includes means 23 for controlling the flow rates of air and water through the various conduits in fixture 13. Line 48 connects fixture 13 to a source of water or to a drain.

Overlying all of lines 14 and 15, as seen in FIG. 1, and all of bottom wall 12 is a support sheet 17 having a plurality of perforations in the form of slits 24 in spaced locations, slits 24 being sufficiently large to permit passage of air, water and fish food or fish excrement or the like in either direction. Support sheet 17 is maintained spacedly above the bottom wall by spaced pads 50 located at the corners of the aquarium and generally medially thereof to provide support for a bed of gravel or rocks 18 as is usually found in the bottom of an aquarium and whatever toys 19 as may be desired. Sheet 17 may be fitted with pipe nipples 16 to be connected to an air line 14 underneath sheet 17 and/or connected to line 46 conducting air to a toy 19. It is to be understood that in this fashion air may be caused to bubble from any desired location or locations in the gravel bed 18, including corner discharges 17, discharges 16 at any location under bed 18, and discharges through toys 19. Sheet 17 may be bendable to contour same into hills and valleys in gravel bed 18 and can be bent to overlie fixture 13 and keep it out of sight or the sheet 17 may be preformed to include a hill portion 51 generally medially of the back wall 52 and/or end walls 11.

In FIGS. 3-6 there are shown the details of fixture 13. Fixture 13 comprises a body 25 having a shoulder 29 and an external threaded portion 30, a nut 26 which is threaded onto portion 30 and two washer-seals 27 and 28. Body 25 passes through a passageway or opening 45 in the glass wall 10 of the aquarium, and is fastened thereto by tightening nut 26 so as to squeeze washer-seals 27 and 28 between nut 26, shoulder 29 and the surfaces of wall 10. A silicone type of sealant may also be used in the opening 45 and between washer seals 27 and 28 and the inner and outer surfaces of glass wall 52 surrounding opening 45. Internally of fixture 13 are passageways for air and for water. Inlet air enters through passageway 31 and exits through a plurality of passageways 32. Water is conducted through passageway 35 in both directions depending on whether it is used to add water to or drain water from the aquarium. In each air outlet line 32 there is a screw thread throttle valve means 43 having a pointed or needle valve end portion to regulate the flow of air therethrough. In water line 35 there is a screw thread valve means including screw 38 and seal 39 affixed thereto to open or close water line 35. A lateral passageway 37 intersects line 35 to permit screw 38 to function as a shut-off valve. Adapter 44 and adapters 40 are employed to permit connection of the air lines 31 and 32, respectively, to plastic hoses, if desired. Similarly an adapter or connector 41 is employed to permit connection of lateral passageway 37 to a flexible rubber hose 48. Hose 15 is shown connected on the inside end of fixture 13 to provide fresh water to or remove contaminated water from the aquarium. Passageways 33 are merely convenience holes produced in drilling the cross connections from air inlet line 31 to air outlet lines 32 and the passageways 33 are closed by plugs 34 so as to direct the air from inlet line 31 to outlet lines 32. This arrangement makes it possible to have all flow control means 43 and 38 to be available at one location on the outside end of fixture 13 and located in an unobtrusive position.

Fixture body 25 and nut 26 are preferably manufactured from a suitable plastic, but may be metal, with washer-seals 27 and 28 preferably an elastomeric material such as rubber, nylon, etc. An appropriate sealant to help fasten fixture 13 into the glass wall 10 is a silicone adhesive which is not affected by water and forms a tight seal with glass, metal, and plastics.

It is contemplated that the fixture may include only two side air passageways 32 with the uppermost passageway being made in conformance with water passageway 35 whereby an external charcoal filter or the like could be provided with water from line 15 exiting from the tank via connector 41 and line 48 to such filter and returned from such filter via appropriate lines to the conformed water passageway, identical to passageway 35, and having a control valve identical to flow control means 38. Of course, such conformed passageway would not communicate with air inlet line 31 and the lateral passageway 33 would be made in conformance with passageway 37 and another connector, identical to connector 41, would be employed to permit connection to another flexible rubber hose, identical to hose 48.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. An aquarium having at least one vertical wall and a bottom wall, said vertical wall having an opening means therethrough adjacent said bottom wall, a fixture mounted through said opening and sealed thereto in a watertight manner, air and water passageways through said fixture communicating between the inside and outside of said aquarium, a perforated support sheet spaced upwardly from and covering substantially all of said bottom wall, said support sheet adapted to receive and be covered with a bed of gravel and other items to resemble the floor of a body of water, external air and water conduits connected to respective said air and water passageways outwardly of said aquarium, internal air and water conduits connected to respective said air and water passageways inwardly of said fixture and leading from said fixture under said support sheet and discharging at selected locations under said bed of gravel, and adjustable valves in said fixture communicating with said passageways to adjust the air flow to any selected rate and to adjust the flow of water into or out of said aquarium or to cease flow of water in either direction.

2. The aquarium of claim 1 wherein said support sheet is contoured so as to cover said fixture from view forwardly and from above.

3. The aquarium of claim 1 further comprising an air outlet means in fluid communication with said internal air conduit for discharging upwardly through said support sheet into a toy article resting on said bed of gravel.

4. The aquarium of claim 1 wherein said fixture includes an elongated body comprising internal and external ends, said air and water passageways being elongated and substantially parallel to each other extending through said elongated body, said body being removably affixed in said opening of said vertical wall, said passageways including internal and external conduit adapter means at the internal and external body ends, respectively, for attachment of said internal and external conduits thereto.

5. The aquarium of claim 4 wherein said body includes a shoulder adjacent the external end of said body, and external screw threads on the outside of said body adjacent the internal end thereof, a nut threadedly engaged with said screw threads on said internal end of said body, an elastomeric washer seal between said shoulder and said wall and an elastomeric washer seal between said nut and said wall, said nut being tightened to sandwich said vertical wall surrounding said opening and both said washer seals between said nut and said shoulder to form a watertight connection therebetween.

6. The aquarium of claim 4 wherein said elongated body has the external end adapted to be outside said vertical wall and the internal end adapted to be inside said vertical wall, said outside end of said body comprising means defining an air inlet and a lateral water passageway, said inside end comprising means defining a plurality of air outlets and a water line, said air passageways communicating said air inlet with each of said air outlets, and said adjustable valves for said air passageways being operative to reduce the cross-section of said air outlets separately and independently of each other.

7. The aquarium of claim 4 wherein said air and water passageways include at least two air passageways, said external conduit adapter means comprising a single conduit adapter outwardly of said aquarium for supplying air through said at least two air passageways to at least two of said internal air conduits.

8. The aquarium of claim 7, wherein said air and water passageways comprises a single water passageway located between two of said at least two air passageways and said bottom wall of said aquarium.

9. The aquarium of claim 1 wherein said adjustable valves extend outwardly of said aquarium.

10. The aquarium of claim 9 wherein said air and water passageways includes a water passageway and an air passageway, wherein said water passageway is located between said air passageway and said bottom wall of said aquarium.

11. In an aquarium having four vertical sidewalls and a bottom wall joined together to hold water therein in a leak proof manner, the improvement comprising an opening means through one of said vertical walls adjacent said bottom wall, a fixture in said opening extending from outside to the inside of said aquarium and sealed to prevent leakage of water around said fixture, said fixture having an elongated water passageway passing therethrough, an air inlet passageway at the outside end of said fixture connected to at least two air outlet passageways at the inside end of said fixture, and flow regulating means in each of said water passageway and said air outlet passageways operable from said outside end of said fixture, at least two flexible air conduits leading from respective said air outlet passageways to any selected discharge location adjacent said bottom wall; and a perforated support sheet adapted to cover said flexible conduits and said inside end of said fixture and said bottom wall and adapted to support a gravel bed and other aquarium items resting on the bed above said bottom wall of said aquarium.

12. In the aquarium of claim 11 wherein said fixture further comprises an elongated cylindrical body, said elongated water passageway and said air outlet passageways extending substantially parallel lengthwise through said body, a shoulder adjacent said outside end of said body and external threads adjacent said inside end of said body, a nut threadedly engaged with said threads, and two elastomeric washer-seals to fit around the exterior of said body inwardly and outwardly of said one sidewall surrounding said opening and through which said fixture is placed, said nut being tightened to squeeze said washers between said shoulder and said nut with said one vertical sidewall sandwiched between said washer-seals to form a watertight connection between said fixture and said aquarium.

13. In the aquarium of claim 11 wherein said flow regulating means includes at least two screw thread adjustable valves respectively communicating with said at least two air outlet passageways to independently regulate the air flow therethrough.

14. In the aquarium of claim 11 wherein said elongated water passageway includes an internally threaded portion adjacent said outside end of said fixture, further comprising a lateral passageway intersecting said elongated water passageway in its threaded portion and extending outwardly to an external outlet means, said flow regulating means including a screw thread adjustable valve in said elongated water passageway and being selectively threadable to open and close said lateral passageway.

15. A fixture for an aquarium to couple a plurality of fluid conduits for delivery into and out of an aquarium, said fixture being adapted to be positioned through an opening in a wall of the aquarium and extending outwardly from both sides of the wall of the aquarium and sealed in watertight relation to the wall of the aquarium, said fixture comprising an elongated body generally conforming to the opening in the wall of the aquarium and including adjacent one end thereof a head portion larger than the opening in the wall of the aquarium and at the other end thereof external screw threads, a nut threadedly engaged with said external screw threads, a plurality of elongated passageways extending lengthwise through said body, a lateral passageway connecting at least two of said elongated passageways for delivery of air thereto, internal threads in said at least two of said elongated passageways, and adjustable screws threadedly connected with said internal threads and adapted to control the flow of air therethrough.

16. A fixture of claim 15 further comprising an air inlet passageway extending substantially parallel to said elongated passageways and communicating with said lateral passageway, said adjustable screws comprising needle valve end portions located in the intersections of said elongated passageways and said lateral passageway to individually adjust the volume of air passing from said air inlet passageway through said lateral passageway and into said at least two of said elongated passageways.

17. A fixture of claim 16 wherein said elongated passageways include one elongated passageway larger in cross-section than said at least two of said elongated passageways for delivery of liquid into or out of the aquarium, said fixture further comprising internal threads in said one larger elongated passageway, a second lateral passageway communicating between said one larger elongated passageway and externally of the aquarium, and an enlarged adjustable screw threadedly connected with said internal threads of said one larger elongated passageway, said screw including an end portion to seal off or completely open the intersection of said one larger elongated passageway and said second lateral passageway.

18. A fixture of claim 15 wherein said adjustable screws are located in said head portion, and wherein said fixture further includes an elongated liquid passageway extending lengthwise through said body and communicating with a second lateral passageway open at said head portion for the ingress and egress of liquid therethrough, and a liquid control means adjustably positioned to control the flow of liquid between said elongated liquid passageway and said second lateral passageway.

* * * * *